US007664829B2

(12) United States Patent
Yamamoto et al.

(10) Patent No.: US 7,664,829 B2
(45) Date of Patent: Feb. 16, 2010

(54) DOCUMENT MANAGING SYSTEM, DOCUMENT MANAGING APPARATUS AND DOCUMENT MANAGING METHOD

(75) Inventors: Kensaku Yamamoto, Saitama (JP); Futoshi Oseto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 450 days.

(21) Appl. No.: 11/552,246

(22) Filed: Oct. 24, 2006

(65) Prior Publication Data
US 2007/0101437 A1 May 3, 2007

(30) Foreign Application Priority Data
Oct. 28, 2005 (JP) ............... 2005-315056
Oct. 11, 2006 (JP) ............... 2006-278079

(51) Int. Cl.
*G06F 15/16* (2006.01)
(52) U.S. Cl. .............. 709/217; 709/218; 709/219; 709/201; 709/200
(58) Field of Classification Search .......... 709/217
See application file for complete search history.

(56) References Cited

U.S. PATENT DOCUMENTS

| 6,424,429 | B1* | 7/2002 | Takahashi et al. | 358/1.16 |
|---|---|---|---|---|
| 6,584,466 | B1* | 6/2003 | Serbinis et al. | 707/10 |
| 2002/0049788 | A1* | 4/2002 | Lipkin et al. | 707/513 |
| 2002/0062360 | A1* | 5/2002 | Ishiguro | 709/219 |
| 2002/0156834 | A1* | 10/2002 | Kitada et al. | 709/203 |
| 2003/0117434 | A1* | 6/2003 | Hugh | 345/744 |
| 2003/0217095 | A1* | 11/2003 | Kitada et al. | 709/201 |
| 2005/0015711 | A1 | 1/2005 | Yamamoto et al. | |
| 2006/0095831 | A1 | 5/2006 | Kawada et al. | |
| 2006/0259490 | A1* | 11/2006 | Horikiri et al. | 707/9 |
| 2007/0047006 | A1* | 3/2007 | Sakai | 358/400 |

FOREIGN PATENT DOCUMENTS

| CN | 1553380 A | 12/2004 |
|---|---|---|
| JP | 2004-70416 | 3/2004 |

OTHER PUBLICATIONS

Hui Zhang, et al., "LDAP-Based Unified User Identity Management Technology in Digital Campuses", Computer Engineering & Science, vol. 27, No. 1, 2005, 11 pages (submitting cover page and English translation only, reference previously filed Jul. 3, 2008).

* cited by examiner

*Primary Examiner*—Firmin Backer
*Assistant Examiner*—Arvin Eskandarnia
(74) *Attorney, Agent, or Firm*—Oblon, Spivak, McClelland, Maier & Neustadt, L.L.P.

(57) ABSTRACT

A document managing system is provided with a plurality of document managing apparatuses each configured to retrieve a document stored in a storage according to a document ID and to judge whether or not an operation with respect to the retrieved document is possible according to a user ID that is generated with respect to each document managing apparatus, and a user ID generating apparatus provided externally to the document managing apparatuses and configured to generate a common user ID that is used in common among each of the document managing apparatuses. Each document managing apparatus has an export and import part configured to export and import data of an arbitrary document and an access control list (ACL).

15 Claims, 12 Drawing Sheets

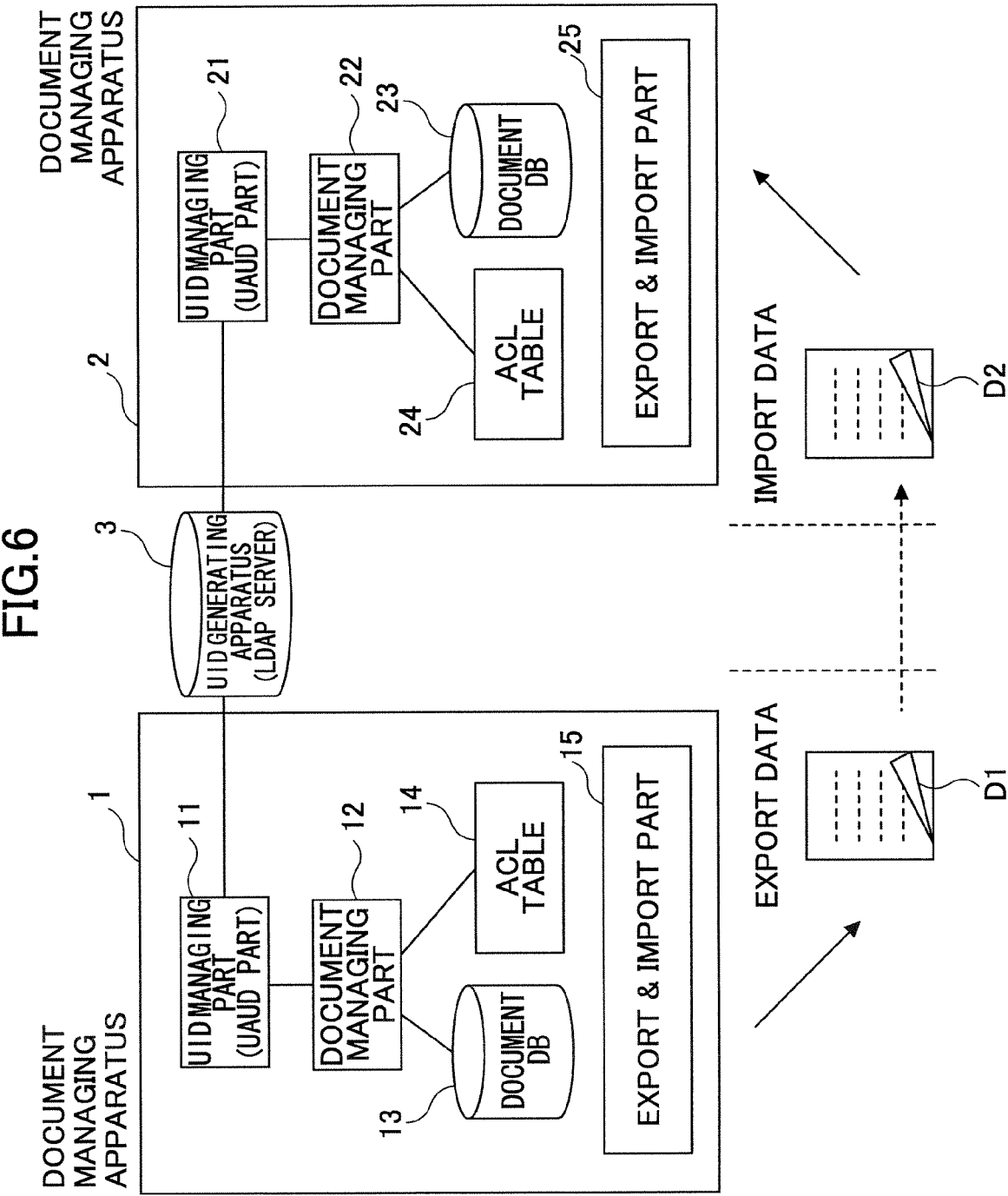

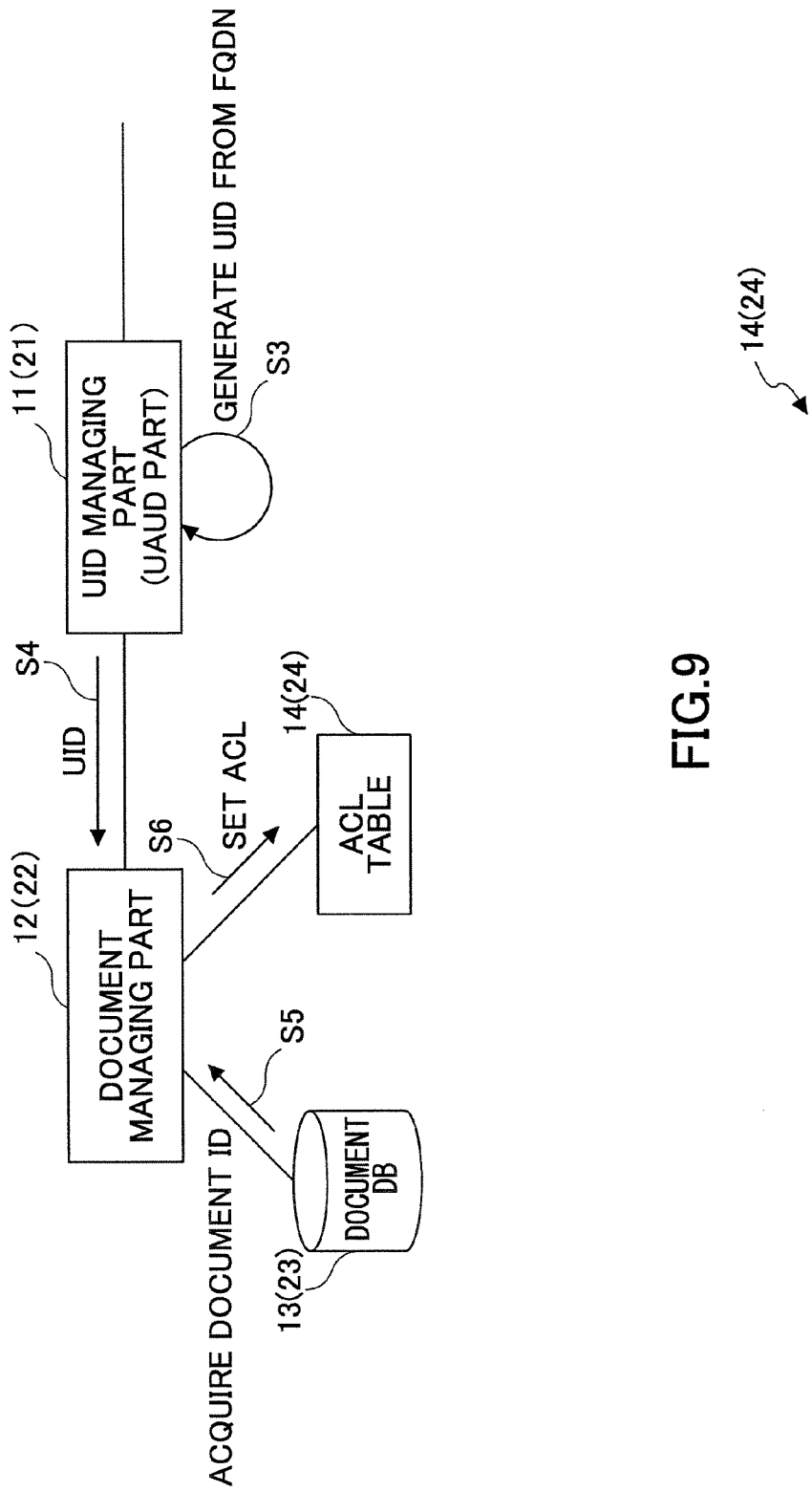

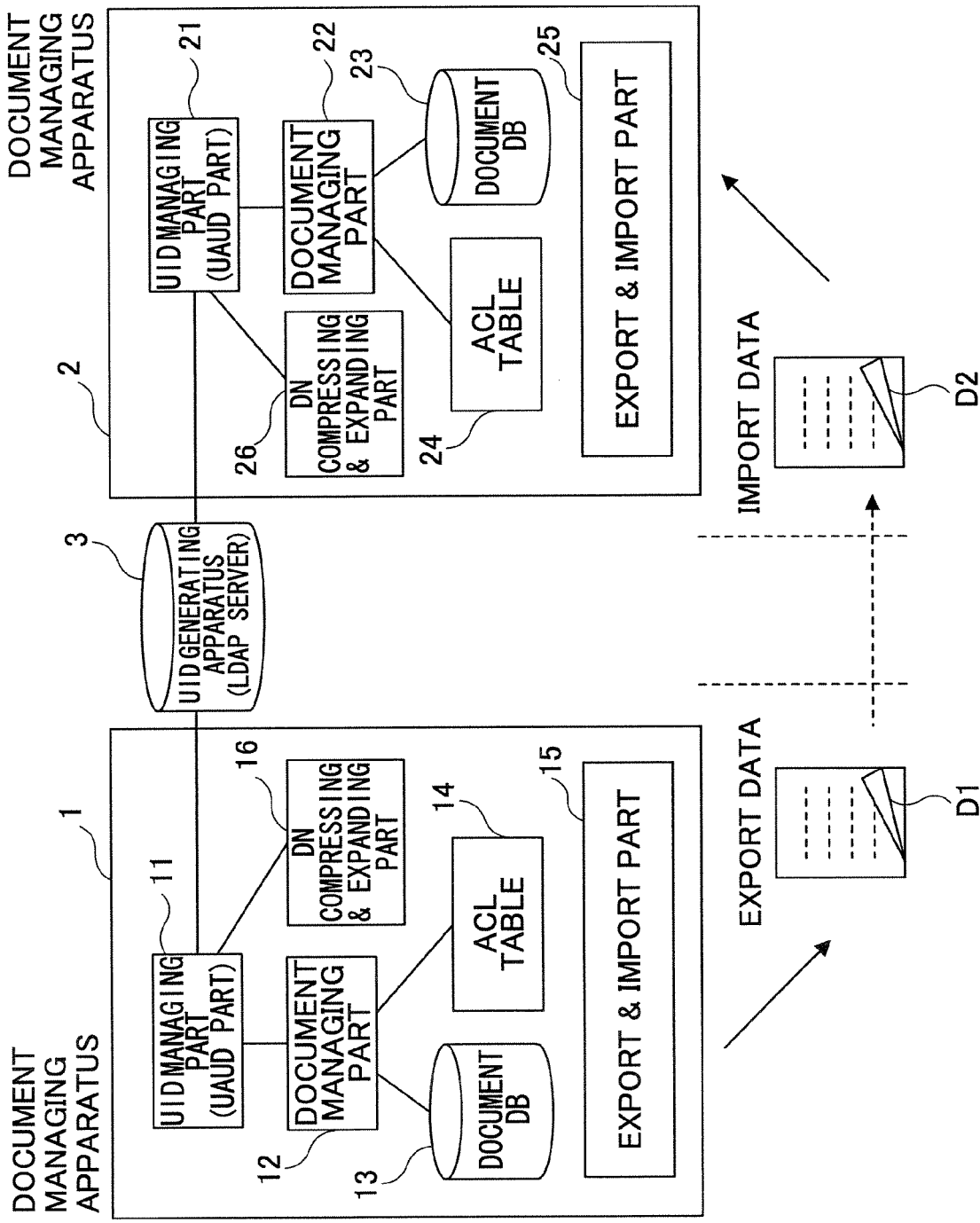

DOCUMENT MANAGING SYSTEM, DOCUMENT MANAGING APPARATUS AND DOCUMENT MANAGING METHOD

BACKGROUND OF THE INVENTION

1. Field of the Invention

The present invention generally relates to document managing systems, and more particularly to a document managing system which has a plurality of independent document managing apparatuses. The present invention also relates to a document managing apparatus and a document managing method employed by the document managing system.

2. Description of the Related Art

A document managing apparatus formed by a server or the like that is provided in a network, records document management information such as bibliographical information. The document management information includes, in addition to an identification (ID) of each document, user IDs (UIDs) of creators, readers, editors and the like. For example, the UID is used to manage rights to access the documents.

In relatively large organizations such as corporations, there often exist a plurality of independent document managing apparatuses.

FIG. 1 is a diagram showing a structure of an example of a conventional document managing system. The document management apparatus 100 shown in FIG. 1 has a UID managing part 101 for managing UIDs, a document managing part 102 for managing documents, a document database (DB) 103 forming a storage for storing the documents, and an access control list (ACL) table 104 that records access right information related to access rights to the documents. A document managing apparatus 200 has a structure similar to that of the document managing apparatus 100, and has an UID managing part 201, a document managing part 202, a document DB 203, and an ACL table 204.

For example, if a user wishes to access a target document that is stored in the document DB 103 of the document managing apparatus 100 in FIG. 1, the document managing part 102 acquires the UID of the user who is authenticated by the UID managing part 101, with respect to the target document that is retrieved from the document DB 103 according to the document ID, and refers to the access right information of the target document by referring to the ACL table 104, and permits access to the user within the range permitted for this user.

On the other hand, a Japanese Laid-Open Patent Application No. 2004-70416 proposes a technique for providing services to a user in a network system employing a plurality of authentication systems, by authenticating a user who is registered for one or a plurality of authentication systems of the network system as the user of a target service.

In the document managing system shown in FIG. 1 having the plurality of independent document managing apparatuses, there are cases where it becomes necessary to distribute, move or integrate a portion or all of the documents managing in one document managing apparatus 100 to the other document managing apparatus 200, for example. In such cases, the target document is distributed from the document managing apparatus 100 as export data D1 to the document managing apparatus 200, and the document managing apparatus 200 accepts the target document as import data D2.

However, The UIDs in the document managing apparatus 100 are managed by the UID managing part 101, and the UIDs in the document managing apparatus 200 are managed by the UID managing part 201, and the UIDs are defined independently for each document managing apparatus. For this reason, when the user who is permitted to access the target document in the document managing apparatus 100 wishes to access the same target document in the document managing apparatus 200, a situation may occur where the user is not be permitted access the target document in the document managing apparatus 200 even though the same user is making access to the same target document.

If this situation occurs, it becomes necessary to reassign the access right to the target document in the document managing apparatus 200. But when a large number of documents are distributed, moved or integrated between the document managing apparatuses 100 and 200, the reassignment of the access rights to the documents becomes an extremely troublesome and complex operation, and there was a problem in that the load on a manager who manages the access rights to the documents will become considerably large.

SUMMARY OF THE INVENTION

Accordingly, it is a general object of the present invention to provide a novel and useful document managing system, a document managing apparatus and a document managing method, in which the problems described above are suppressed.

Another and more specific object of the present invention is to provide a document managing system, a document managing apparatus and a document managing method, which can facilitate the management of the access rights to documents when the documents are distributed, moved or integrated among the plurality of independent document managing apparatuses of the document managing system.

Still another object of the present invention is to provide a document managing system comprising a plurality of document managing apparatuses, each of the document managing apparatuses being configured to retrieve a document stored in a storage according to a document ID, and to judge whether or not an operation with respect to the retrieved document is possible according to a user ID that is generated with respect to the each of the document managing apparatuses; and a user ID generating apparatus, provided externally to the document managing apparatuses, and configured to generate a common user ID that is used in common among each of the document managing apparatuses, wherein each of the document managing apparatuses has an export and import part configured to export and import data of an arbitrary document and an access control list (ACL). According to the document managing system of the present invention, it is possible to facilitate the management of the access rights to documents when the documents are distributed, moved or integrated among a plurality of independent document managing apparatuses of the document managing system.

A further object of the present invention is to provide a document managing apparatus for retrieving a document stored in a storage according to a document ID and judging whether or not an operation with respect to the retrieved document is possible according to a user ID that is generated with respect to the document managing apparatus, comprising a user ID managing part configured to manage user IDs within the document managing apparatus by acquiring a common user ID that is generated by an external user ID generating apparatus and is used in common among a plurality of document managing apparatuses including the document managing apparatus; and an export and import part configured to export and import data of an arbitrary document and an access control list (ACL). According to the document managing apparatus of the present invention, it is possible to facilitate the management of the access rights to documents when the documents are distributed, moved or integrated among a plurality of independent document managing apparatuses of a document managing system.

Another object of the present invention is to provide a document managing method for a document managing system in which each of a plurality of document managing apparatuses is configured to retrieve a document stored in a storage according to a document ID, and to judge whether or not an operation with respect to the retrieved document is possible according to a user ID that is generated with respect to said each of the document managing apparatuses, comprising generating a common user ID that is used in common among each of the document managing apparatuses by a user ID generating apparatus that is provided externally to the document managing apparatuses; and exporting and importing data of an arbitrary document and an access control list (ACL) in response to a user instruction. According to the document managing method of the present invention, it is possible to facilitate the management of the access rights to documents when the documents are distributed, moved or integrated among the plurality of independent document managing apparatuses of the document managing system.

Other objects and further features of the present invention will be apparent from the following detailed description when read in conjunction with the accompanying drawings.

BRIEF DESCRIPTION OF THE DRAWINGS

FIG. 6 is a diagram showing a structure of a second embodiment of the document managing system according to the present invention;

FIG. 8 is a diagram for explaining an ACL setting process of the second embodiment of the document managing system;

FIG. 9 is a diagram showing an ACL table;

FIG. 10 is a diagram showing a structure of a third embodiment of the document managing system according to the present invention;

DESCRIPTION OF THE PREFERRED EMBODIMENTS

A description will be given of embodiments of the document managing system, the document managing apparatus and the document managing method according to the present invention, by referring to FIG. 2 and the subsequent figures.

First Embodiment

Figure 1:
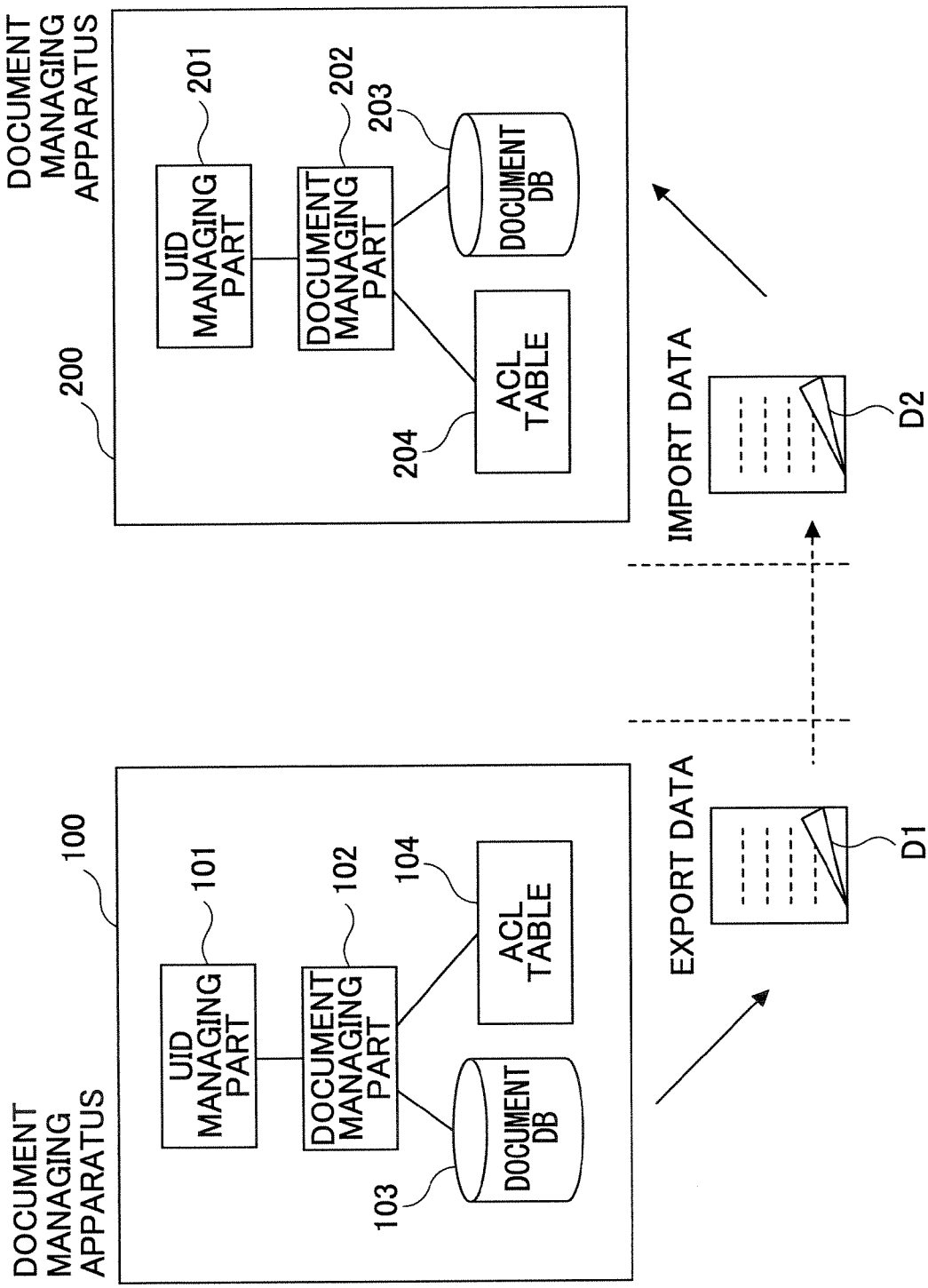
FIG. 1 is a diagram showing a structure of an example of a conventional document managing system.
Figure 2:
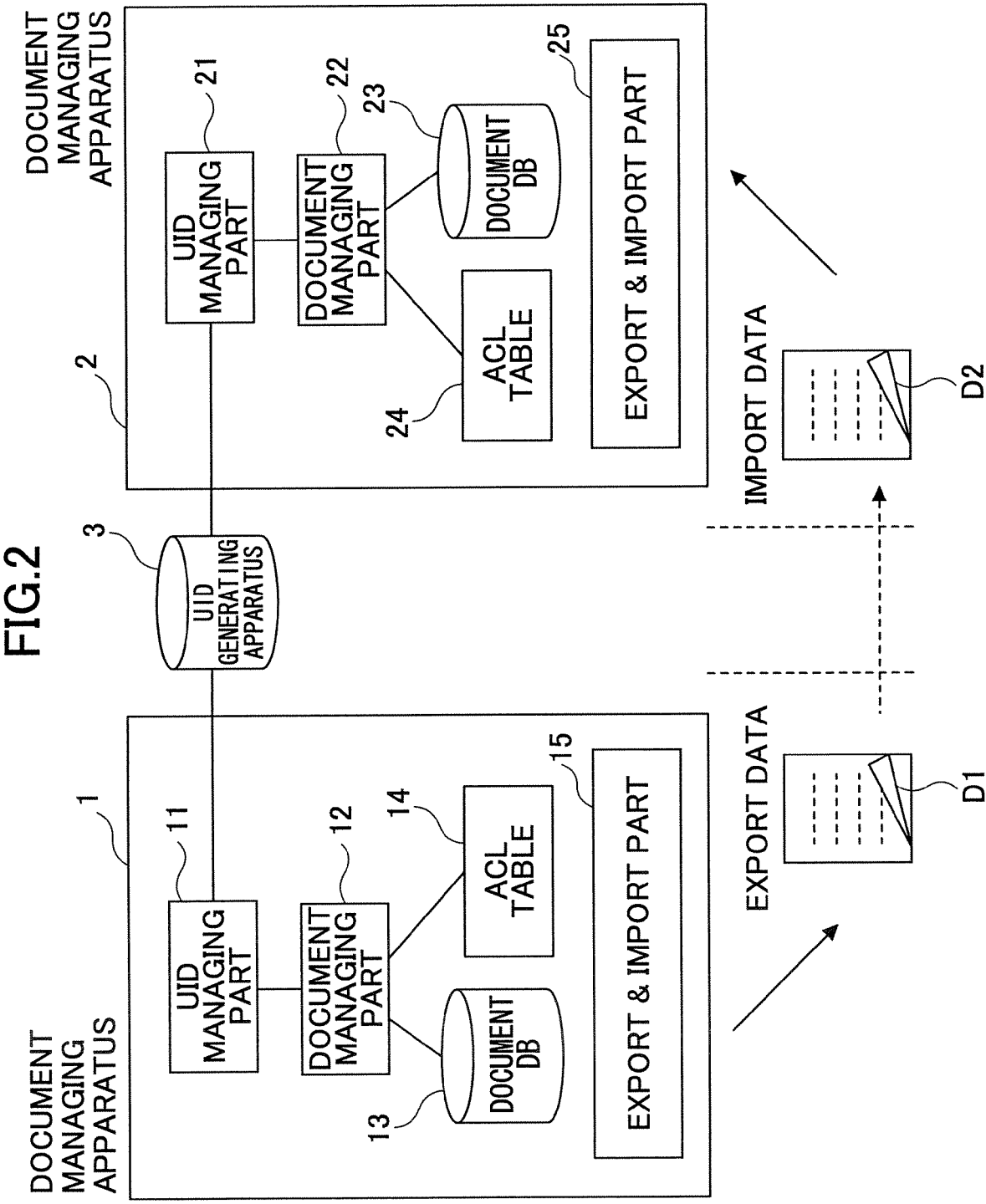
FIG. 2 is a diagram showing a structure of a first embodiment of a document managing system according to the present invention.

FIG. 2 is a diagram showing a structure of a first embodiment of the document managing system according to the present invention. The document managing system shown in FIG. 2 has a first document managing apparatus 1 and a second document managing apparatus 2. Each of the first and second document managing apparatuses 1 and 2 may be a dedicated server apparatus for exclusive use or, an apparatus, such as a multi function peripheral (MFP), having functions other than the document managing function.

The first document managing apparatus 1 has a user identification (UID) managing part 11 for managing UIDs, a document managing part 12 for managing documents, a document database (DB) 13 forming a storage for storing the documents, an access control list (ACL) table 14 that records access right information related to access rights to the documents, and an export and import part 15 exporting and importing the documents and the ACL. Similarly, the second document managing apparatus 2 has a user identification (UID) managing part 21 for managing UIDs, a document managing part 22 for managing documents, a document database (DB) 23 forming a storage for storing the documents, an access control list (ACL) table 24 that records access right information related to access rights to the documents, and an export and import part 25 exporting and importing the documents and the ACL. The UID is not limited to the kind of UID that is input at the time of the authentication or the like, and may be any suitable UID indicating user attributes such as the post (group, department, etc.), the position and the authority (authorized limits of rights or power).

In addition to the first and second document managing apparatuses 1 and 2, the document managing system has a UID generating apparatus 3 for generating UIDs that are used in common between the first and second document managing apparatuses 1 and 2. Of course, the number of document managing apparatuses provided in the document managing system is of course not limited to two.

When storing the document in the document DB 13 in the first document managing apparatus 1, the document managing part 12 acquires the UID from the UID managing part 11, and sets the acquired UID in the ACL table 14 in correspondence with the document ID. In this state, the UID managing part 11 acquires from the UID generating apparatus 3 a common UID that is common to the first and second document managing apparatuses 1 and 2, and this common UID is reflected to the ACL table 14.

Similarly, when storing the document in the document DB 23 in the second document managing apparatus 2, the document managing part 22 acquires the UID from the UID managing part 21, and sets the acquired UID in the ACL table 24 in correspondence with the document ID. In this state, the UID managing part 21 acquires from the UID generating apparatus 3 a common UID that is common to the first and second document managing apparatuses 1 and 2, and this common UID is reflected to the ACL table 24.

Hence, the UID can be made common between the first and second document managing apparatuses 1 and 2 even when the first and second document managing apparatuses 1 and 2 are independent of each other. Consequently, even when the documents are distributed, moved or integrated between the first and second document managing apparatuses 1 and 2, it is possible to avoid an inconvenient situation where the user who is permitted to access a target document in one of the first and second document managing apparatuses 1 and 2 becomes unable to access the same target document in the other of the first and second document managing apparatuses 1 and 2.

Figure 3:
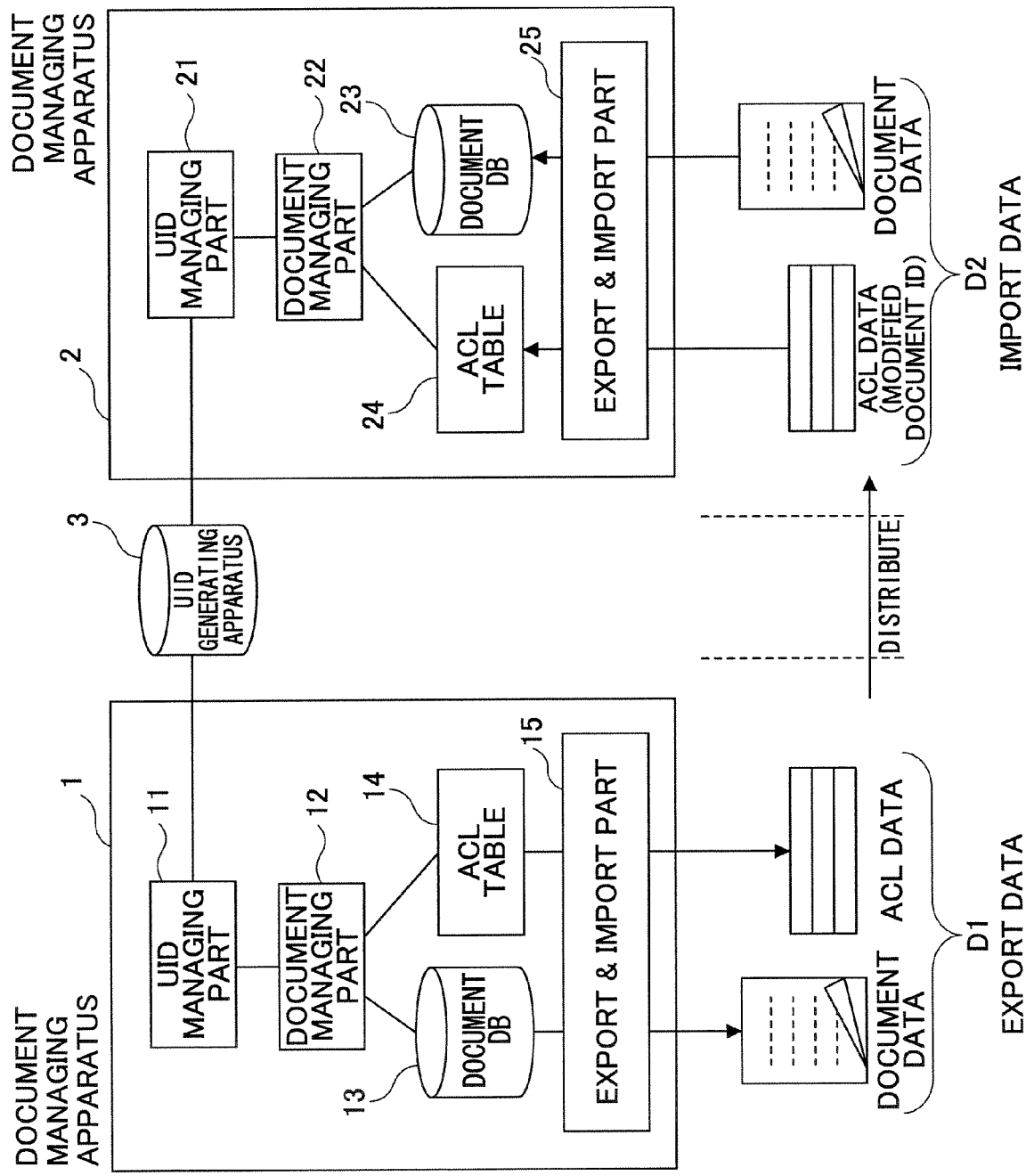
FIG. 3 is a diagram for explaining a document distribution in the first embodiment of the document managing system.

FIG. 3 is a diagram for explaining a document distribution in this first embodiment of the document managing system. When distributing the document from the first document managing apparatus 1 to the second document managing apparatus 2, the export and import part 15 of the first document managing apparatus 1 distributes, as export data D1, the data of the document (that is, the document data) and the ACL data. On the other hand, the second document managing apparatus 2 receives the document data and the ACL data as import data D2, and stores the document data in the document DB 23 and reflects the ACL data in the ACL table 24 (that is, modifies the document ID), so as to maintain access right consistency.

Figure 4:
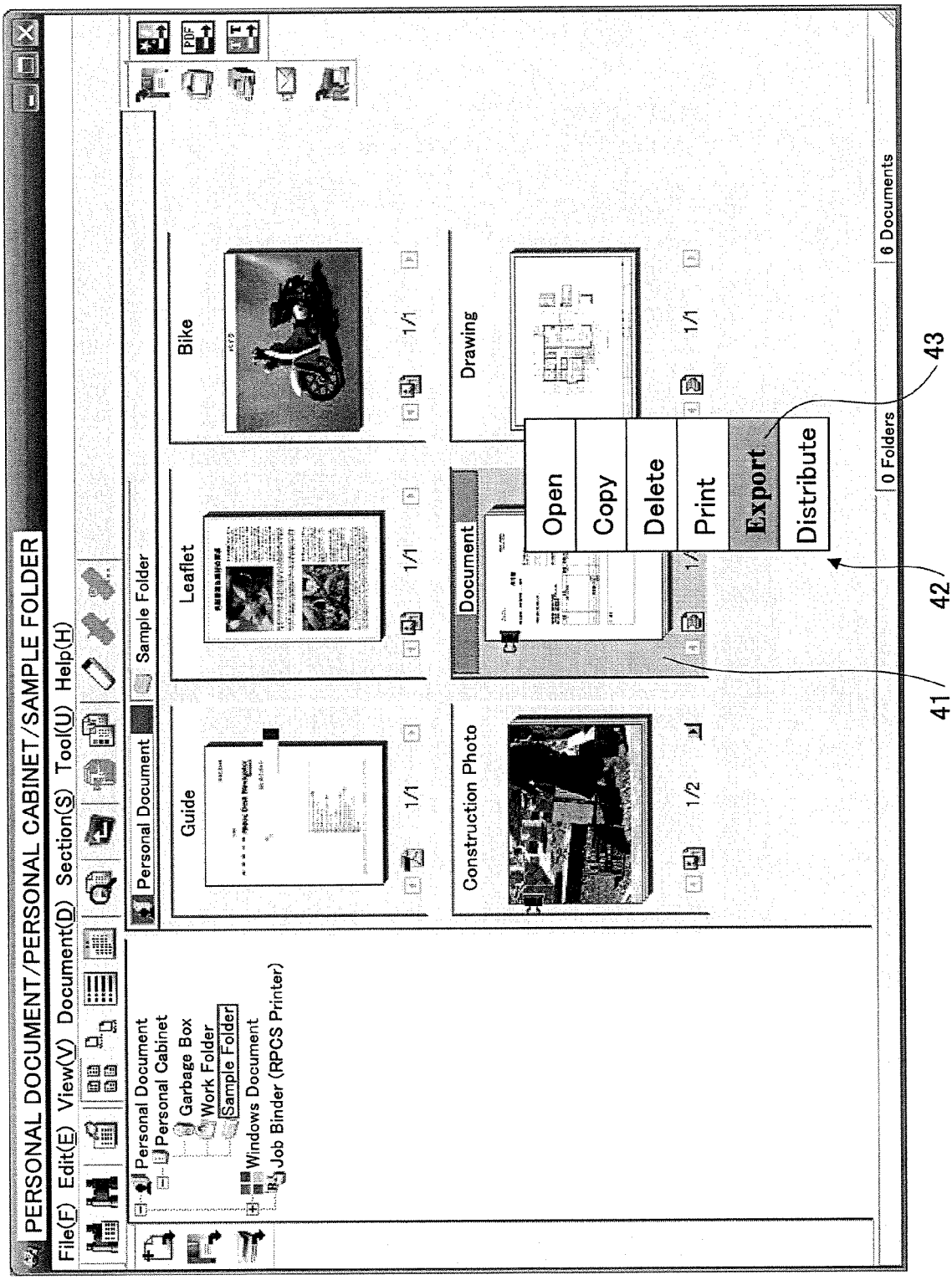
FIG. 4 is a diagram showing a screen for explaining an export operation.

FIG. 4 is a diagram showing a screen for explaining an export operation. In FIG. 4, a document 41 that is to be exported is selected by a client software of the first document managing apparatus 1 or on an operation panel of an MFP, and an "Export" button in a pop-up menu 42 that is displayed is selected using a right-click of a mouse or the like, so as to instruct an export process. Then, a storage location of the export data is specified, and the execution of the export process is instructed. The export and import part 15 shown in FIG. 3 inputs the document ID, and retrieves from the document DB 13 the document data corresponding to the document ID. In addition, export and import part 15 obtains the ACL data corresponding to the document ID from the ACL table 14, and changes the document ID within the obtained ACL data to an indefinite value.

The export data may be moved to the second document managing apparatus 2 by any suitable means, such as (A) sharing a disk in the network, (B) transferring the export data using the network by a file transfer protocol (ftp) or the like, and (C) using a removable storage medium such as an universal serial bus (USB) memory key and an external hard disk drive (HDD).

Figure 5:
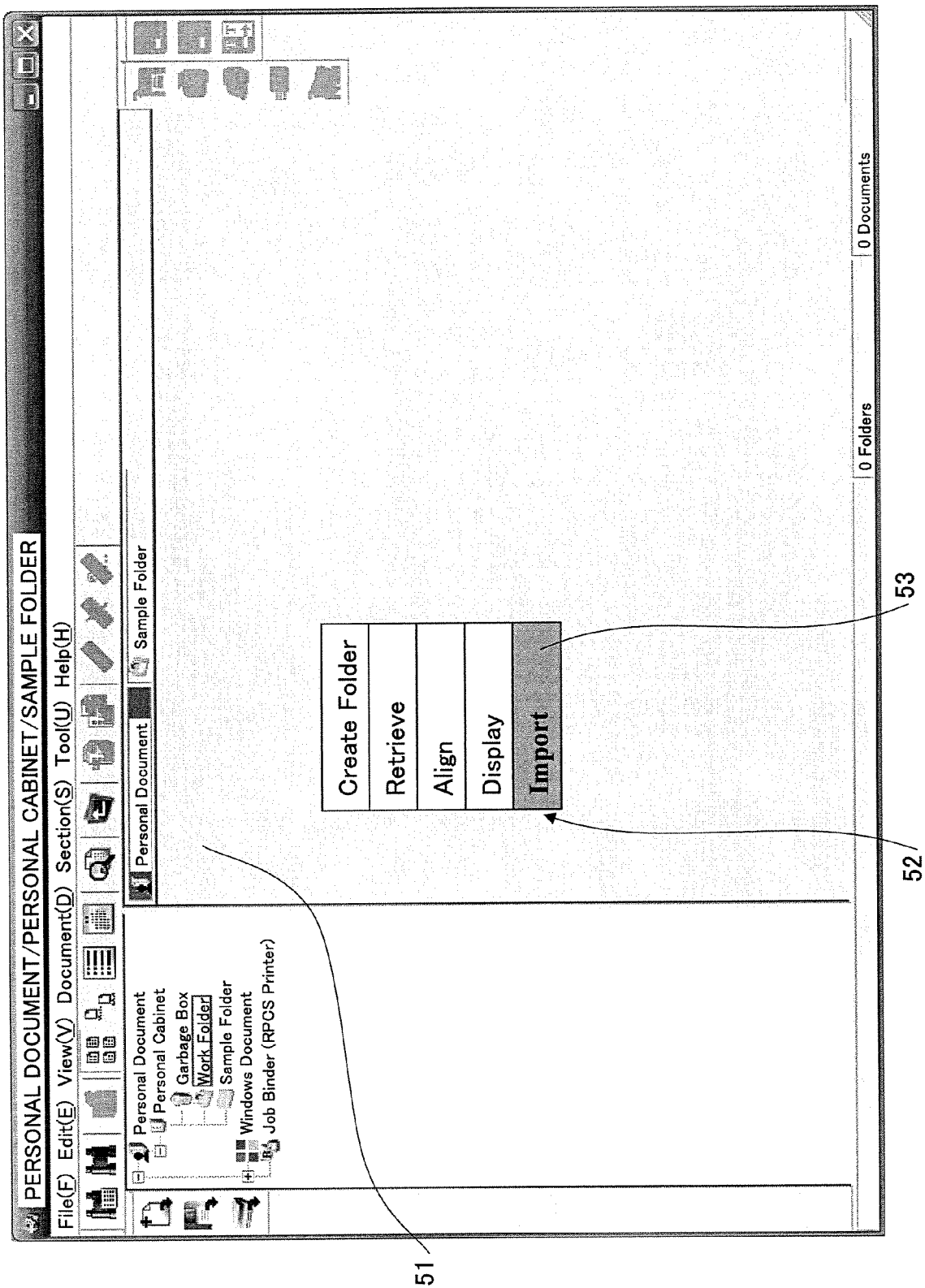
FIG. 5 is a diagram showing a screen for explaining an import operation.

FIG. 5 is a diagram showing a screen for explaining an import operation. In FIG. 5, a logical storage location 51 of the document, such as a folder, for storing the imported document, is selected by a client software of the second document managing apparatus 2 or on an operation panel of an MFP, and an "Import" button 53 in a pop-up menu 52 that is displayed is selected using a right-click of a mouse or the like, so as to instruct an import process. Then, the import data is specified, and the execution of the import process is instructed. The export and import part 25 shown in FIG. 3 inputs the export data that includes the document data and the ACL data, registers the document data in the document DB 23, and obtains a new document ID. Next, the export and import part 25 updates the document ID within the ACL data using the new document ID, and registers the ACL data having the updated document ID in the ACL table 24.

Instead of carrying out the export operation, the first document managing apparatus 1 may directly carry out a distribution operation. In this case, the document that is to be distributed is selected by the client software of the first document managing apparatus 1 or on the operation panel of the MFP, so as to instruct a distribution process. In addition, the first document managing apparatus 1 specifies the second document managing apparatus 2 as the distribution destination and the specifies the logical storage location of the document, such as the folder, within the second document managing apparatus 2, so as to instruct the execution of the distribution process. The distribution operation described above is realized by successively carrying out the export process and the import process in this manner by the first and second document managing apparatuses 1 and 2.

Therefore, by providing the UID generating apparatus 3 externally to the first and second document managing apparatuses 1 and 2 and independently of the first and second document managing apparatuses 1 and 2, the first and second document managing apparatuses 1 and 2 can share the services provided by the UID generating apparatus 3. As a result, it is possible to generate the common UID that is common to the first and second document managing apparatuses 1 and 2 (that is, common to a plurality of document managing apparatuses), and to provide the same UID with respect to the same user. Hence, it becomes unnecessary to reassign the access rights to documents when the documents are distributed, moved or integrated among a plurality of document managing apparatuses.

Second Embodiment

FIG. 6 is a diagram showing a structure of a second embodiment of the document managing system according to the present invention. In FIG. 6, those parts that are the same as those corresponding parts in FIG. 2 are designated by the same reference numerals, and a description thereof will be omitted. In this second embodiment, the UID generating apparatus 3 is formed by a lightweight directory access protocol (LDAP) server, and the UID managing parts 11 and 21 of the first and second document managing apparatuses 1 and 2 are formed by user authentication for user directory (UAUD) parts in accordance therewith.

Figure 7A:
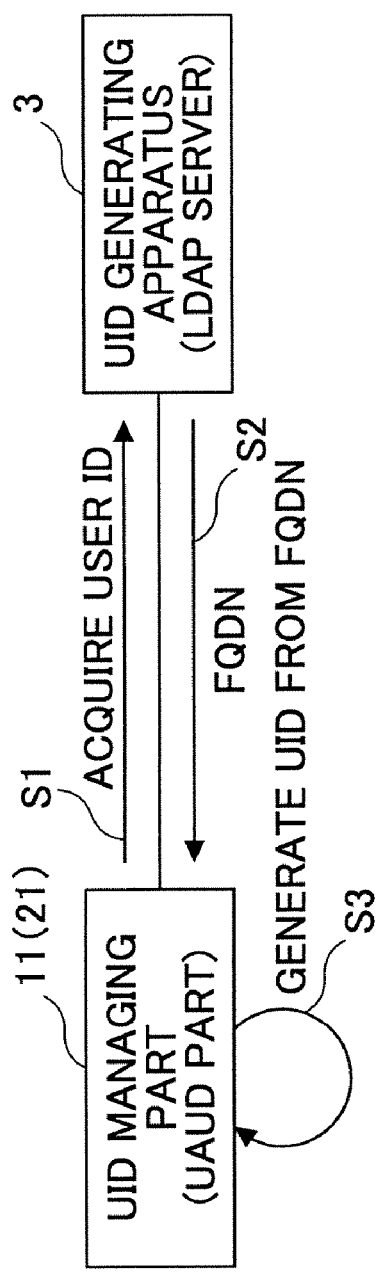
FIGS. 7A and 7B are diagrams for explaining a UID generating process of the second embodiment of the document managing system.
Figure 7B:
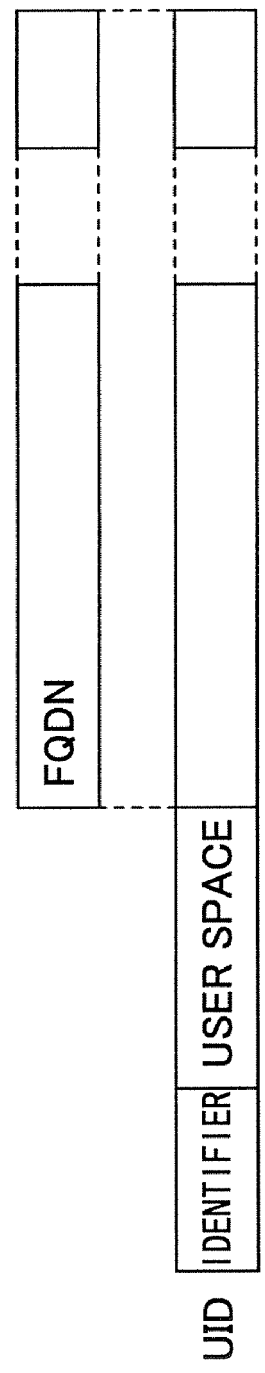

FIGS. 7A and 7B are diagrams for explaining a UID generating process of this second embodiment of the document managing system. When the user is specified and the UID acquisition is requested from the UID managing part 11 (or 21) of the document managing apparatus 1 (or 2) to the UID generating apparatus 3 in a step S1 shown in FIG. 7A, the LDAP server which forms the UID generating apparatus 3 returns a fully qualified distinguish name (FQDN), which is a global unique name of the user, in a step S2. Then, the UID managing part 11 (or 21) generates the UID from the FQDN in a step S3.

FIG. 7B shows a logical format of the UID of this embodiment. The UID shown in FIG. 7B has an identifier for indicating a type of the user or user group, a user space for identifying a type of the database that stores the user information, and the FQDN that is acquired from the LDAP server.

FIG. 8 is a diagram for explaining an ACL setting process of this second embodiment of the document managing system. After the UID managing part 11 (or 21) generates the UID in the step S3 shown in FIG. 8, the UID managing part 11 (or 21) transfers the UID to the document managing part 12 (or 22) in a step S4. The document managing part 12 (or 22) acquires the document ID from the document DB 13 (or 23) in a step S5, and sets the acquired document ID in the ACL table 14 (or 24) in a step S6.

FIG. 9 is a diagram showing the ACL table 14 (or 24). In the ACL table 14 (or 24) shown in FIG. 9, the UID and the access right are recorded in the ACL table 14 (or 24) in correspondence with the document ID. In FIG. 9, RW indicates the right to make access by referring or updating, and R indicates the right to make access by referring.

Third Embodiment

FIG. 10 is a diagram showing a structure of a third embodiment of the document managing system according to the present invention. In FIG. 10, those parts that are the same as those corresponding parts in FIG. 6 are designated by the same reference numerals, and a description thereof will be omitted. In FIG. 10, distinguish name (DN) compressing and expanding parts 16 and 26 are additionally provided in the first and second document managing apparatuses 1 and 2, respectively. The DN compressing and expanding part 16 compresses and expands the UID that is set in the ACL table 14, and the DN compressing and expanding part 26 compresses and expands the UID that is set in the ACL table 24. Otherwise, the structure of this third embodiment is the same as that of the second embodiment shown in FIG. 6.

When the LDAP server is used as the UID generating apparatus 3, the maximum length of the FQDN data that is obtained therefrom cannot be prescribed in advance. On the other hand, in order to enable the document managing apparatus to create the ACL table that manages the ACL, it is inconvenient from the point of view of prescribing the format of the ACL table if the maximum length of the global unique name of the user cannot be prescribed, as is the case of the FQDN data.

Hence, in this third embodiment, the FQDN that is obtained from the UID generating apparatus 3 is not used as it is when generating the UID, but is compressed into a substitute FQDN that can be accommodated within the ACL table even in the case of a relatively long FQDN. In other words, it is possible to extend the limit of the maximum length of the FQDN that is recordable in the ACL table.

Figure 11:
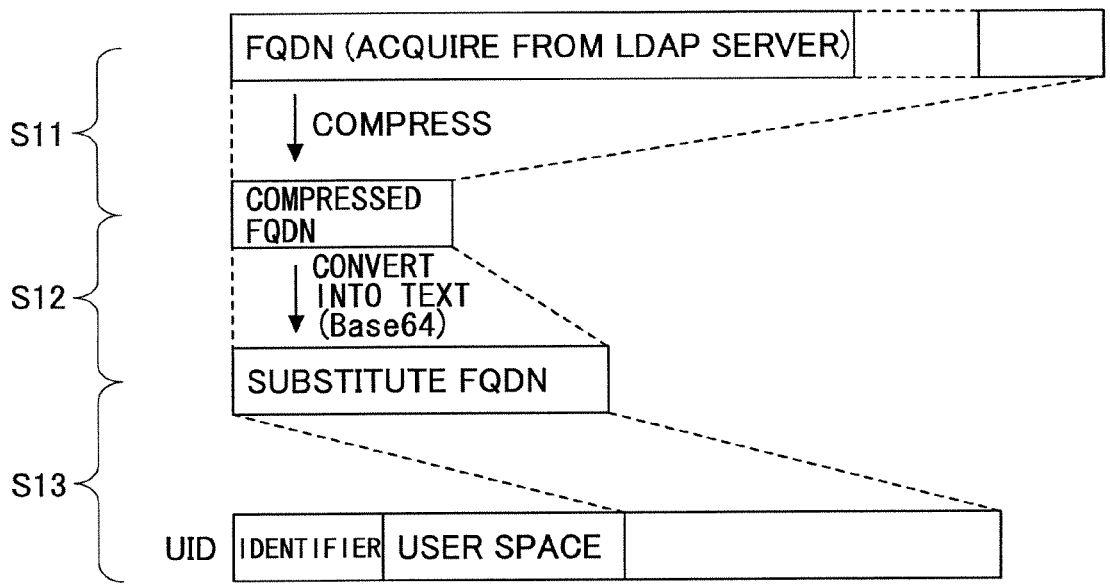
FIG. 11 is a diagram for explaining a UID generating process of the third embodiment of the document managing system.

FIG. 11 is a diagram for explaining a UID generating process of this third embodiment of the document managing system. In FIG. 11, the FQDN that is obtained from the UID generating apparatus 3 by the UID managing part 11 (or 21) of the document managing apparatus 1 (or 2) is compressed by the DN compressing and expanding part 16 (or 26) into a compressed FQDN in binary data state, in a step S11. Any suitable known compression techniques may be used for the compression of the FQDN, but on an average, it is possible to obtain a compression rate (or efficiency) on the order of approximately 70%.

Then, the DN compressing and expanding part 16 (or 26) generates the substitute FQDN in a step S12 by converting the compressed FQDN into text such as Base 64, so that the substitute FQDN in a text data state may be used as a portion of the UID. The data size slightly increases by this conversion into the text, but the compression rate (or efficiency) on the order of approximately 50% can be anticipated by the combination of the compression and the conversion into the text.

Figure 12:
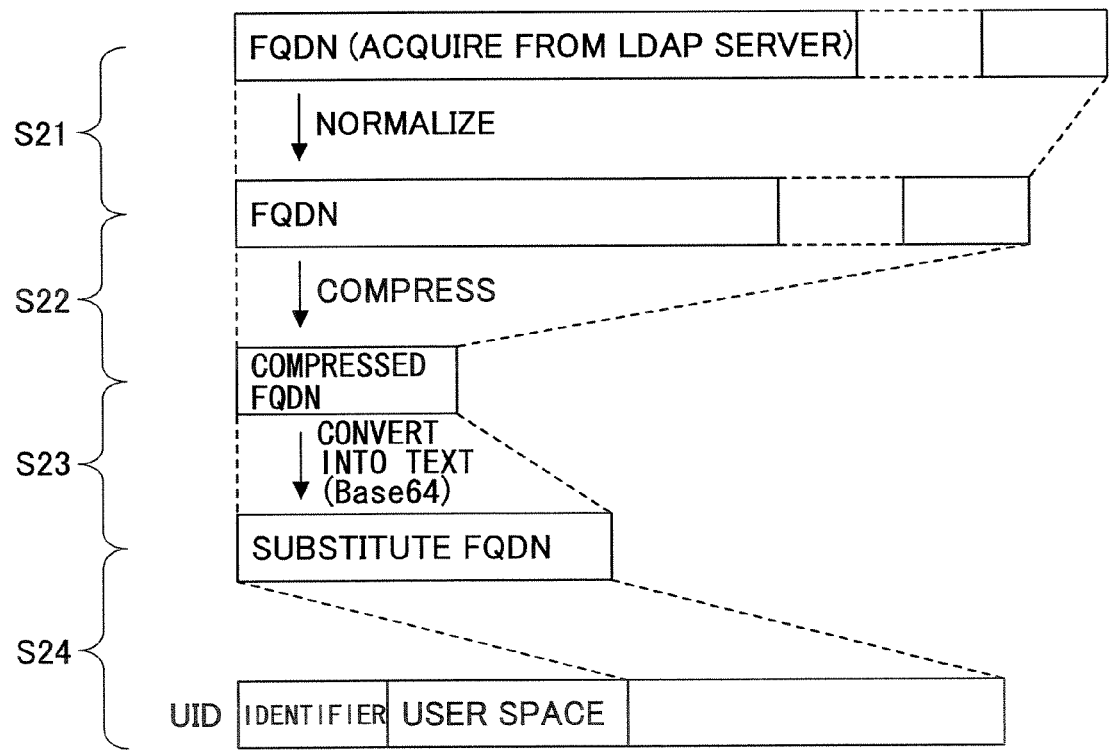
FIG. 12 is a diagram for explaining another UID generating process of the third embodiment of the document managing system.

FIG. 12 is a diagram for explaining another UID generating process of this third embodiment of the document managing system. In this case, instead of directly compressing the FQDN that is obtained from the UID generating apparatus 3, a normalizing process is carried out in a step S21 to remove spaces (which should originally be ignored) before and after a delimiter that may be included in the FQDN. Steps S22 through S24 that are carried out thereafter are the same as the steps S11 through S13 shown in FIG. 11, except that the step S22 compresses the FQDN that has been removed of the space.

Therefore, by compressing the FQDN as shown in FIG. 11 or FIG. 12, it is possible to extend the limit of the maximum length of the FQDN that is usable for the ACL.

In addition, it is possible to acquire the original FQDN by carrying out an expanding operation in the DN compressing and expanding part 16 (or 26) to expand the substitute FQDN under the control of the UID managing part 11 (or 21). Accordingly, the document managing apparatus 1 (or 2) can make the access to the LDAP server which forms the UID generating apparatus 3, in a normal manner.

Fourth Embodiment

Figure 13:
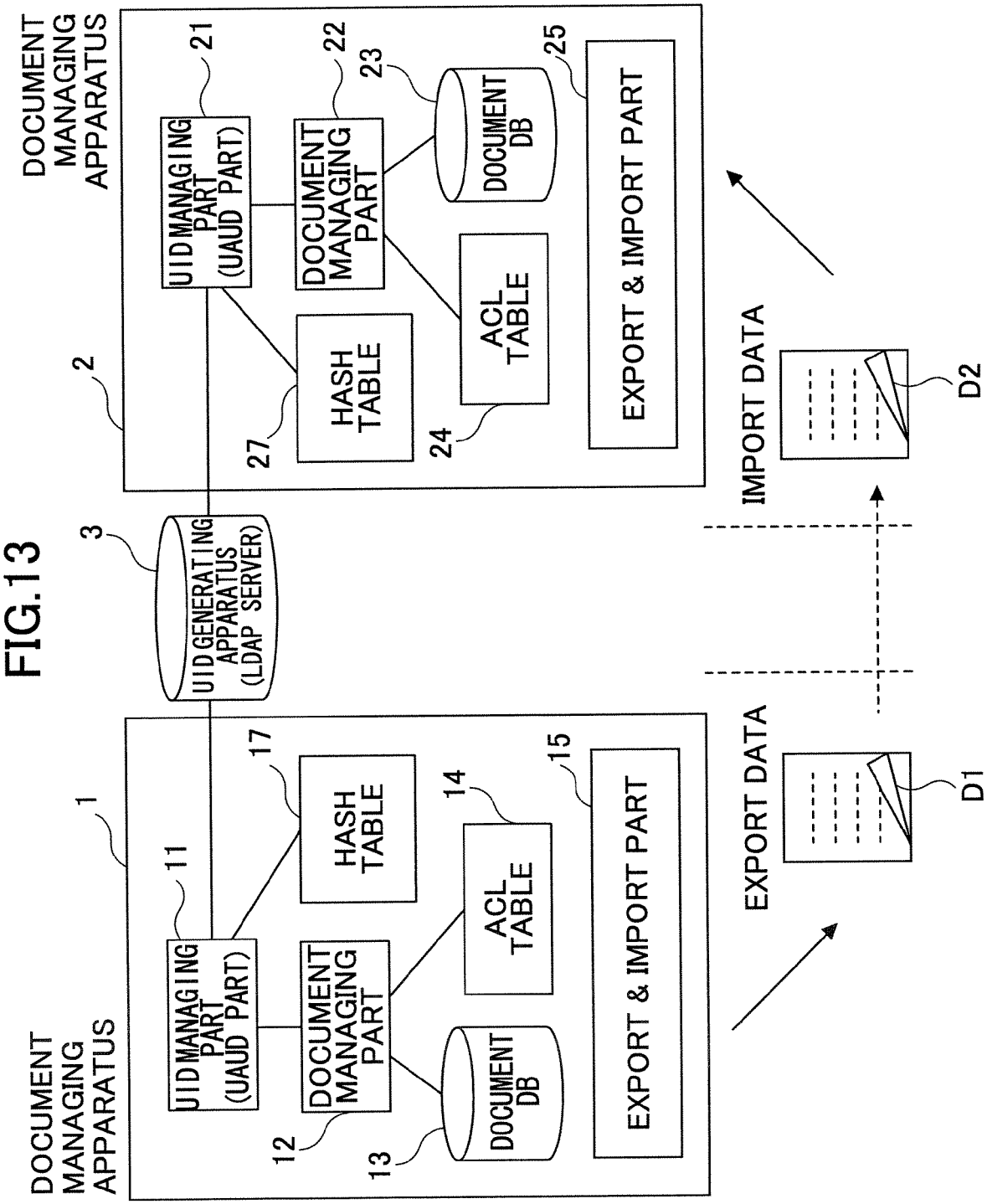
FIG. 13 is a diagram showing a structure of a fourth embodiment of the document managing system according to the present invention.

FIG. 13 is a diagram showing a structure of a fourth embodiment of the document managing system according to the present invention. In FIG. 13, those parts that are the same as those corresponding parts in FIG. 6 are designated by the same reference numerals, and a description thereof will be omitted. In FIG. 13, hash tables 17 and 27 are additionally provided in the first and second document managing apparatuses 1 and 2, respectively. In this fourth embodiment, the FQDN that is obtained from the UID generating apparatus 3 is not used as it is when generating the UID, similarly as in the case of the third embodiment described above, and the FQDN is subjected to a hash process, so that the FQDN that can be accommodated within the ACL table even in the case of a relatively long FQDN. More particularly, the UID managing part 11 (or 21) of the document managing apparatus 1 (or 2) carries out the hash process with respect to the FQDN, and records a hash value and the original FQDN in correspondence with each other in the hash table 17 (or 27). In addition, the hash value (or hash code) of the FQDN data and a predetermined number of header (or leading) bytes of the FQDN data are set in the ACL table 14 (or 24) as a substitute UID.

Figure 14:
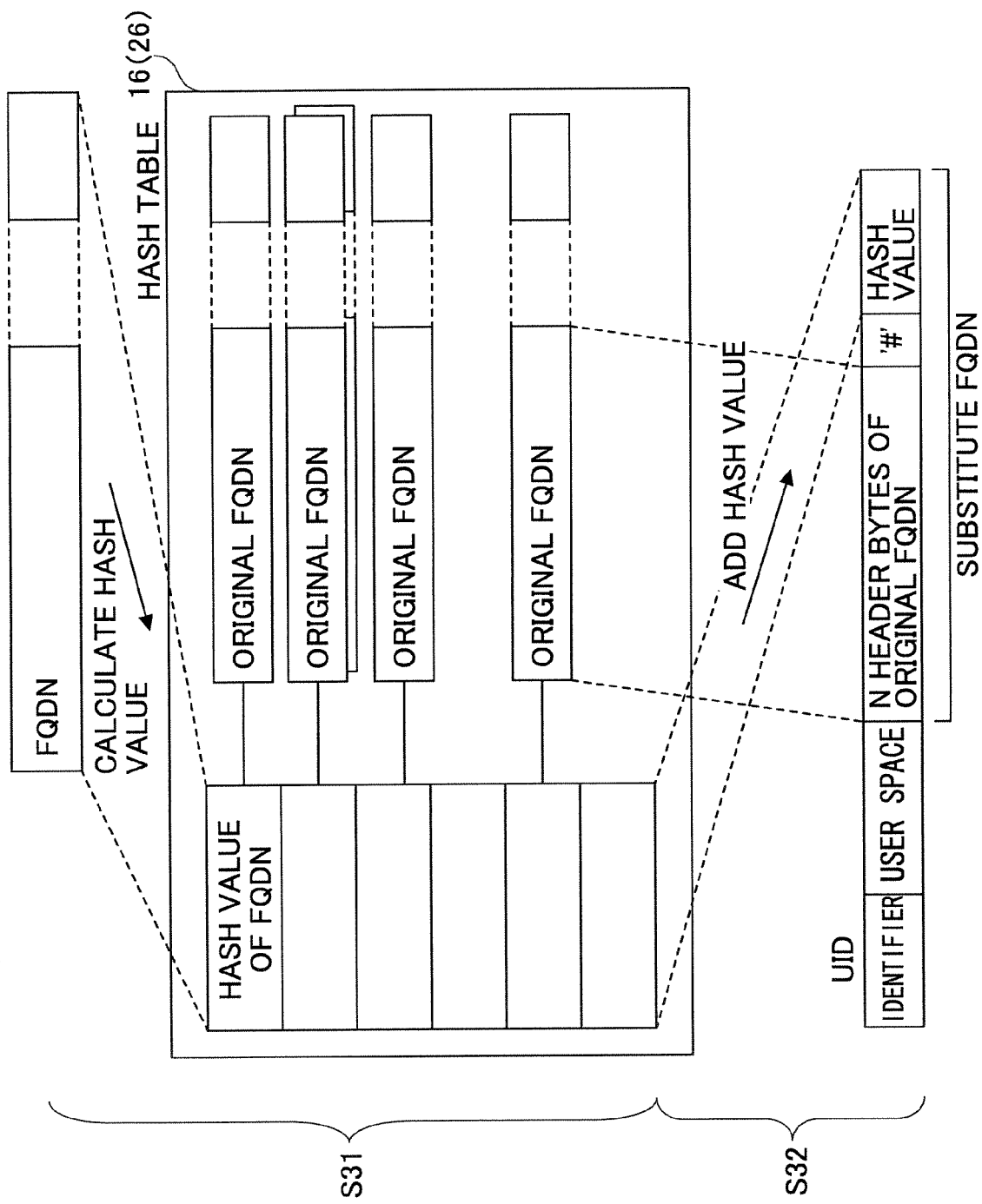
FIG. 14 is a diagram showing a UID generating process of the fourth embodiment of the document managing system.

FIG. 14 is a diagram showing a UID generating process of this fourth embodiment of the document managing system. In FIG. 14, the UID managing part 11 (or 21) of the document managing apparatus 1 (or 2) calculates the hash value using an algorithm such as MD5, based on the FQDN obtained from the UID generating apparatus 3, and sets the calculated hash value in the hash table 17 (or 27) in correspondence with the original FQDN, in a step S31. In this case, the hash values obtained from the same FQDN will become the same, but in order to maintain the hash value to a small size, a plurality of FQDNs are allowed to correspond to the same hash value. It is assumed that the FQDN is normalized to remove the unnecessary spaces prior to carrying out the hash process.

Then, the UID managing part 11 (or 21) regards the N header (or leading) bytes of the original FQDN, the delimiter (#) and the hash value as the substitute FQDN, and generates the UID by combining an identifier and a user space, in a step S32. The N header (or leading) bytes of the original FQDN are included in the substitute FQDN in order to enable the FQDN to be specified, since a plurality of FQDNs are allowed to correspond to the same hash value. The FQDN is prescribed by the user name, host name, sub domain name, domain name, organization type and country code, in this order. The identification of the FQDN becomes more difficult towards the latter portion of this order, but since there is no information overlap at the header portion of the FQDN (that is, the information in the header portions of the FQDNs do not match), it is possible to specify the FQDN by the header portion.

By generating the UID from the FQDN through the conversion into the hash value, the hash value having an arbitrary length can be made to uniquely correspond to the FQDN and be used as the substitute UID.

In addition, the UID managing part 11 (or 21) can acquire the original FQDN from the hash table 17 (or 27) by carrying out a restoration operation with respect to the substitute FQDN. Accordingly, the document managing apparatus 1 (or 2) can make the access to the LDAP server which forms the UID generating apparatus 3, in a normal manner.

This application claims the benefit of Japanese Patent Applications No. 2005-315056 filed Oct. 28, 2005 and No. 2006-278079 filed Oct. 11, 2006, in the Japanese Patent Office, the disclosures of which are hereby incorporated by reference.

Further, the present invention is not limited to these embodiments, but various variations and modifications may be made without departing from the scope of the present invention.

The invention claimed is:

1. A document managing system comprising:
a plurality of document managing apparatuses, each of the document managing apparatuses being configured to retrieve a document stored in a document database according to a document ID, and to judge whether or not an operation with respect to the retrieved document is possible according to a first user ID that is generated with respect to said each of the document managing apparatuses;
a user ID generating apparatus, provided externally to the document managing apparatuses, configured to generate a second user ID that is common among the plurality of document managing apparatuses;
each of the document managing apparatuses including
a user ID managing part configured to acquire and manage the first user ID and the second user ID:
a document managing part configured to manage the document in correspondence with an access right to the document by associating the first user ID and the document ID:
an access control list (ACL) table part configured to register the access right to the document by associating the first user ID and the document ID as ACL data; and
an export and import part configured to export and import document data of the document and the ACL data,
wherein a first export and import part of a first document managing apparatus among the plurality of document managing apparatuses is configured to export the document data and the ACL data of the document to a second document managing apparatus,
a second export and import part of the second document managing apparatus is configured to import the document data and the ACL data of the document exported by the first export and import part,
a second document managing part of the second document managing apparatus is configured to register the received document data and the ACL data in a document database of the second document managing apparatus, to acquire a new document ID, and to update the document ID included in the received ACL data to the new document ID, and
a second user ID managing part of the second document managing apparatus is configured to acquire the second user ID, common among the first and second document managing apparatuses from the user ID generating part, and to associate and register the second user ID with the new document ID in an access control list (ACL) table part of the second document managing apparatus.

2. The document managing system as claimed in claim 1, wherein the first export and import part changes a document ID within the data of the ACL into an indefinite value when exporting the document data and the ACL.

3. The document managing system as claimed in claim 1, wherein the user ID managing part is configured to generate a user ID that is set in the ACL table within said each of the document managing apparatuses based on a portion of data acquired from the user ID generating apparatus.

4. A document managing apparatus for retrieving a document stored in a document database according to a document ID and judging whether or not an operation with respect to the retrieved document is possible according to a first user ID that is generated with respect to the document managing apparatus, comprising:
a user ID managing part configured to manage user IDs within the document managing apparatus by acquiring a second user ID that is generated by an external user ID generating apparatus and is common among a plurality of document managing apparatuses including the document managing apparatus;
a document managing part configured to manage the document in correspondence with an access right to the document by associating the first user ID and the document ID;
an access control list (ACL) table part configured to register the access right to the document by associating the first user ID and the document ID as ACL data; and
an export and import part configured to export and import document data and the ACL data of an arbitrary document, wherein
a first export and import part of a first document managing apparatus among the plurality of document managing apparatuses is configured to export the document data and the ACL data of the document to a second document managing apparatus,
a second export and import part of the second document managing apparatus is configured to import the document data and the ACL data of the document exported by the first export and import part,
a second document managing part of the second document managing apparatus is configured to register the received document data and the ACL data in a document database of the second document managing apparatus, to acquire a new document ID, and to update the document ID included in the received ACL data to the new document ID, and
a second user ID managing part of the second document managing apparatus is configured to acquire the second user ID, common among the first and second document managing apparatuses from the user ID generating part, and to associate and register the second user ID with the new document ID in a second ACL table part of the second document managing apparatus.

5. The document managing apparatus as claimed in claim 4, wherein the export and import part changes a document ID within the data of the ACL into an indefinite value when exporting the data of the document and the ACL.

6. The document managing apparatus as claimed in claim 4, wherein the user ID managing part generates a user ID that is set in the ACL table based on a portion of data acquired from the external user ID generating apparatus.

7. A document managing method for a document managing system in which each of a plurality of document managing apparatuses is configured to retrieve a document stored in a document database according to a document ID, and to judge whether or not an operation with respect to the retrieved document is possible according to a first user ID that is generated with respect to said each of the document managing apparatuses, comprising:
generating a second user ID that is common among each of the document managing apparatuses by a user ID generating apparatus;
managing, in a user ID managing section, user IDs within the document managing apparatus by acquiring the second user ID that is generated by an external user ID generating apparatus and is common among a plurality of document managing apparatuses including the document managing apparatus;

managing, in a document managing section, the document in correspondence with an access right to the document by associating the first user ID and the document ID;

registering, in an access control list (ACL) table section, the access right to the document by associating the first user ID and the document ID as ACL data; and exporting and importing, through an export and import section, document and the ACL data of an arbitrary document in response to a user instruction, wherein the exporting and importing includes
exporting, from a first export and import section of a first document managing apparatus, the document data and the ACL data of the document to a second document managing apparatus, and importing, in a second export and import part of the second document managing apparatus, the document data and the ACL data of the document exported by the first export and import section, the registering includes registering the received document data and the ACL data in a document database of the second document managing apparatus, acquiring a new document ID, and updating the document ID included in the received ACL data to the new document ID, and the managing user IDs within the document managing apparatus includes acquiring the second user ID, common among the first and second document managing apparatuses from the user ID generating part, and associating and registering the second user ID with the new document ID in an access control list (ACL) table section of the second document managing apparatus.

8. The document managing method as claimed in claim 7, comprising:

changing a document ID within ACL data into an indefinite value when exporting the document data and the ACL data.

9. The document managing method as claimed in claim 7, further comprising:

generating a user ID that is set in the ACL table within said each of the document managing apparatuses based on a portion of data acquired from the user ID generating apparatus.

10. The document managing system according to claim 1, wherein each of the document managing apparatuses further comprises:

a compressing part configured to compress the second user ID acquired from the user ID generating apparatus and to generate a substitute compressed second user ID.

11. The document managing apparatus according to claim 4, further comprising:

a compressing part configured to compress the second user ID acquired from the user ID generating apparatus and to generate a substitute compressed second user ID.

12. The document managing method according to claim 7, wherein the acquiring the second user ID comprises:

compressing the second user ID acquired from the user ID generating apparatus and generating a substitute compressed second user ID.

13. The document managing system according to claim 1, wherein the UID managing part in each of the document managing apparatuses is configured to calculate hash values based on the second user ID acquired from the user ID generating apparatus and to generate a substitute hashed second user ID.

14. The document managing apparatus according to claim 4, wherein the UID managing part is configured to calculate hash values based on the second user ID acquired from the user ID generating apparatus and to generate a substitute hashed second user ID.

15. The document managing method according to claim 7, wherein the acquiring the second user ID comprises:

calculating hash values based on the second user ID acquired from the user ID generating apparatus and generating a substitute hashed second user ID.

* * * * *